(12) United States Patent
Hasegawa

(10) Patent No.: US 6,182,806 B1
(45) Date of Patent: Feb. 6, 2001

(54) HYDRAULIC SHOCK ABSORBER

(75) Inventor: Tadashi Hasegawa, Saitama (JP)

(73) Assignee: Showa Corporation (JP)

( * ) Notice: Under 35 U.S.C. 154(b), the term of this patent shall be extended for 0 days.

(21) Appl. No.: 09/132,832

(22) Filed: Aug. 12, 1998

(30) Foreign Application Priority Data

Sep. 9, 1997 (JP) .................................................. 9-259408

(51) Int. Cl.[7] ...................................................... F16F 9/00
(52) U.S. Cl. ........................ 188/314; 188/297; 267/64.26
(58) Field of Search ................................ 188/282.6, 313, 188/314, 315, 297; 267/64.13, 64.26, 64.15

(56) References Cited

U.S. PATENT DOCUMENTS

| | | | | |
|---|---|---|---|---|
| 3,750,855 | * | 8/1973 | Peddinghaus | 188/314 |
| 3,955,655 | * | 5/1976 | Pornin | 188/313 |
| 4,720,085 | * | 1/1988 | Shinbori et al. | 267/64.16 |
| 4,821,983 | * | 4/1989 | Aubry et al. | 188/313 |
| 5,797,594 | * | 8/1998 | Sekine et al. | 188/315 |

FOREIGN PATENT DOCUMENTS 51129988   3/1950   (JP) .

\* cited by examiner

*Primary Examiner*—Robert J. Oberleitner
*Assistant Examiner*—Thomas J. Williams
(74) *Attorney, Agent, or Firm*—Orum & Roth

(57) ABSTRACT

The present invention provides a hydraulic shock absorber 10, with a cylinder 12 which is filled with a hydraulic fluid; a piston 14 connected to one end of a piston rod 15, which is slidably located in the cylinder; and a free piston 47 which is slidably located in the cylinder so as to partition the cylinder into a gas chamber 45 and an oil chamber 16A, and wherein a gas chamber cartridge 48 is inserted into one side of the cylinder 12 so as to be fixed thereto, and the free piston 47 slidably disposed in a gas chamber case 46 of the gas chamber cartridge 48, defining one chamber partitioned by the free pistion 47 of the gas chamber case 46 as the gas chamber 45 encloses a gas therein, and defining the other chamber partitioned by the free pistion 47 of the gase chamber case 46 as connected to the oil chamber 16A on the other side of the cylinder 12.

7 Claims, 5 Drawing Sheets

HYDRAULIC SHOCK ABSORBER

BACKGROUND OF THE INVENTION

1. Field of the Invention

The present invention relates to a hydraulic shock absorber, which has an improved structure of a gas chamber defined by a partition wall member such as a free piston.

2. Description of the Related Art

For hydraulic shock absorbers used in four-wheeled vehicles and two-wheeled vehicles, there has been proposed an erect strut type structure as disclosed in Japanese Utility Model Application Laid-Open (JP-U) No. 51-129988, and an inverted strut type structure shown in FIG. 5. As shown in the prior art, FIG. 5, the hydraulic shock absorber 1 has a cylinder 2 is filled with a hydraulic fluid, and a piston 3 is slidably provided therein. The piston 3 is provided with a damping valve 4 for generating a damping force, and is connected to one end of a piston rod 5. Further, in order to absorb the capacity resulting from the piston rod 5 reciprocating in the cylinder 2, the cylinder 2 is formed with a gas chamber 6, and a free piston 8 partitioning the gas chamber 6 and an oil chamber 7 is slidably provided in the cylinder 2.

On the inner circumferential surface of the cylinder 2, in the slidable range Y of the free piston 8 is grease lubrication. In the slidable range X of the piston 3 is a hydraulic fluid lubrication (oil lubrication). Thus, in order to improve the responsibility of free piston 8 and a resistant abrasion performance of the free piston 8 and the cylinder 2, a surface roughness (coarseness) of the slidable range Y of the free piston 8 must be twice the degree as the surface roughness of the slidable range X of the piston 3. For this reason, there is a problem of increasing the number of processes for machining the cylinder 2.

Further, in the cylinder 2, the slidable range Y of the free piston 8 is set outside the slidable range X of the piston 3; for this reason, a stopper 9 for stopping a sliding motion of the free piston 8 must be fixed in the cylinder 2. This increases the number of processes for machining the cylinder 2.

Further, a gas is encapsulated in the cylinder 2, and thereafter, a hydraulic fluid is filled therein, and thus, the aforesaid hydraulic shock absorber 1 is assembled. For this reason, an assembling apparatus becomes complicate, and is made into a large size, and in addition, the number of processes for assembling the hydraulic shock absorber 1.

Moreover, in the aforesaid hydraulic shock absorber 1, a stud 2A for vehicle body attachment is fixed onto the cylinder 2 by bending the end portion of the cylinder 2. When a lateral direction (direction perpendicular to an axis of the hydraulic shock absorber) load (torsion (twisting) load F) is applied (acts) onto the stud 2A, an insertion length of the stud 2A with respect to the cylinder 2 is short. For this reason, there is a need of increasing a strength of bending the stud 2A to the end portion of the cylinder 2 in order to secure a strength against the torsion load F.

SUMMARY OF THE INVENTION

The present invention has been made in view of the aforesaid problems in the prior art. It is, therefore, an object of the present invention to provide a hydraulic shock absorber which can reduce the number of machining processes and the number of assembling processes.

To achieve the above object, the present invention provides a hydraulic shock absorber comprises; a cylinder which is filled with a hydraulic fluid; a piston connected to one end of a piston rod, and which is slidably disposed in the cylinder; and a partition wall member which is slidably disposed in the cylinder so as to partition the cylinder into a gas chamber and an oil chamber, wherein a gas chamber cartridge inserted into one side of the cylinder so as to be fixed thereto, the partition wall member is slidably disposed in the gas chamber case of the gas chamber cartridge, defining one chamber partitioned by the partition wall member of the gas chamber case as the gas chamber encloses a gas therein, and defining the other chamber partitioned by the partition wall member of the gas chamber case as connected to the oil chamber on the other side of the cylinder.

BRIEF DESCRIPTION OF THE DRAWINGS

The present invention will be understood more fully from the detailed description of the accompanying drawings of the preferred embodiments of the invention, which are given by way of example only, and are not intended to limit the present invention.

DESCRIPTION OF THE PREFERRED ENBODIMENTS

Figure 1:
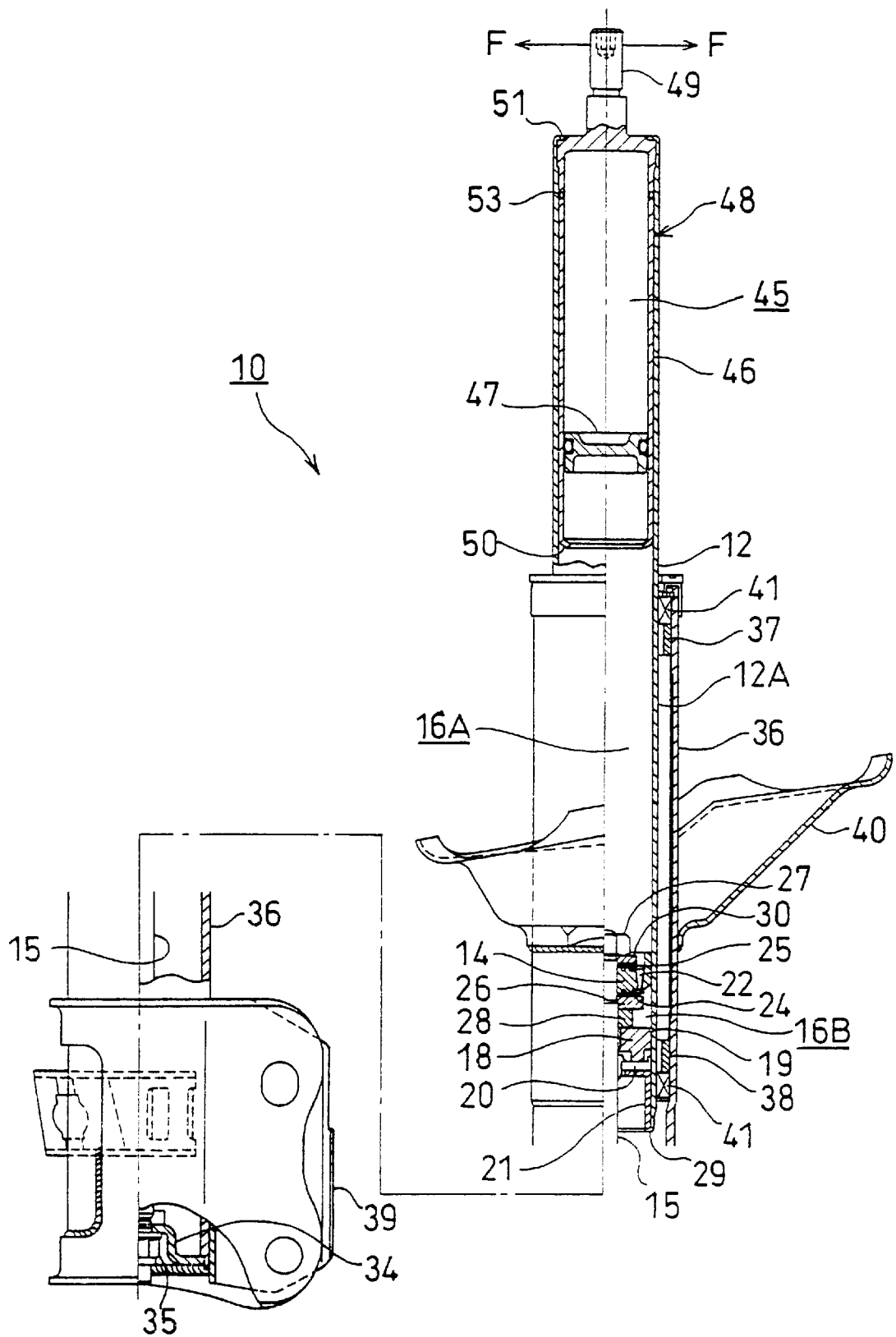
FIG. 1 is a cross-sectional view showing a hydraulic shock absorber according to one embodiment of the present invention.

As shown in FIG. 1, a hydraulic shock absorber 10, which is used in a four-wheeled vehicle, is constructed integrally with a suspension spring (not shown) so as to constitute a cushion unit. This cushion unit is arranged on a vehicle body side and on an axle side. The suspension spring absorbs an impact from a road surface, and the hydraulic shock absorber 10 damps a vibration of the cushion unit, and thus, vibration of the vehicle body is restricted. FIG. 1 shows a the most extended state of the hydraulic shock absorber 10.

The hydraulic shock absorber 10 is constructed in a manner that cylinder 12 comprises a single tube filled with a hydraulic fluid, and a piston 14 is slidably provided therein and is connected to one end of a piston rod 15. One of the other sides of the cylinder 12 is watertightly closed by a gas chamber cartridge 48, which will be described later, and by a rod guide 18, respectively. Another end of the piston rod 15 penetrates through the rod guide 18 extend outside the cylinder 12. By the piston 14, the cylinder 12 is partitioned into a rod-side chamber 16B which is filled with a hydraulic fluid and receives and houses the piston rod 15, and a piston-side chamber 16A which is filled with a hydraulic fluid and does not receive and house the piston rod 15.

The rod guide 18 is provided adjacent to a seal 20, and this rod guide 18 is fixed on the cylinder 12 via the seal 20 in a state of being held between a stopper ring 19 and a retaining member 21. The retaining member 21 is supported on the cylinder 12 by means of a bending portion 29 on the other end portion of the cylinder 12.

Figure 2:
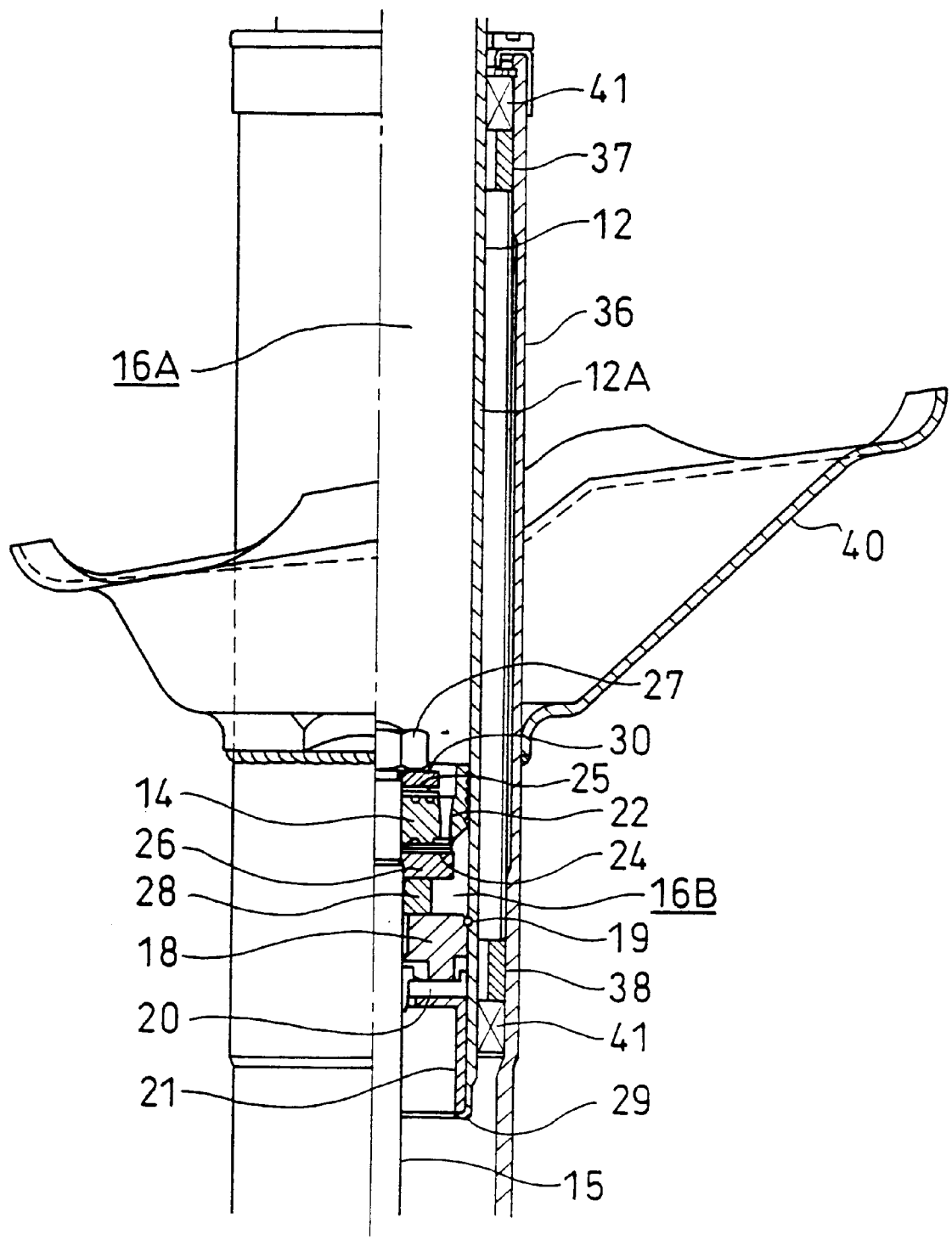
FIG. 2 is an enlarged cross-sectional view showing an axial-direction central portion of the hydraulic shock absorber shown in FIG. 1.

As shown in FIG. 2, one end portion of the piston rod 15 penetrates through the center portion of the piston 14. In the piston 14, a compression side channel 22 and an extension or expansion side channel (not shown) are alternately formed therethrough at the circumference of the piston rod 15. One side face of the piston 14 is provided with a compression side damping valve 24 for closing the compression side channel 22, and the other side face of the piston 14 is provided with an extension side damping valve 25 for closing the extension side channel. The piston 14, the compression side damping valve 24 and the extension side damping valve 25 are held down by means of valve retainers 26 and 30 and a nut 27, and are constructed integrally with the piston rod 15.

In a compression stroke of the hydraulic shock absorber 10, the hydraulic fluid in the piston side chamber 16A passes through the compression side channel 22 so as to elastically deform the compression side damping valve 24, and then, flows into the rod side chamber 16B. At this time, a compression side damping force is generated by a fluid resistance when the hydraulic fluid elastically deforms the compression side damping valve 24.

Further, in the extension stroke of the hydraulic shock absorber 10, the hydraulic fluid in the piston side chamber 16B passes through the extension side channel so as to elastically deform the extension side damping valve 25, and then, flows into the piston side chamber 16A. At this time, a extension side damping force is generated by a fluid resistance when the hydraulic fluid elastically deforms the extension side damping valve 25.

In this case, a rebound rubber 28 is fitted into the piston rod 15 in a state of contact with the valve retainer 26. When the rebound rubber 28 abuts the rod guide 18, the maximum stroke of the hydraulic shock absorber 10 is reached.

In the hydraulic shock absorber 10 shown in FIG. 1, an end member 34 is fastened onto the other end portion of the piston rod 15 by means of a nut 35, and a reinforcing tube 36 is fixed on the outer circumference of the end member 34. The reinforcing tube 36 has a cylindrical shape, and is attached with an upper guide bush 37 and a lower guide bush 38 at a predetermined distance at an inner peripheral surface on one side thereof. Further, the reinforcing tube 36 is slidably supported on an outer peripheral surface 12A of the cylinder 12 via the upper guide bush 37 and lower guide bush 38.

Moreover, an axle bracket 39 for supporting an axle is fixed to an outer circumferential portion on the other end side of the reinforcing tube 36 by welding. The hydraulic shock absorber 10 is an inverted strut type hydraulic shock absorber. Thus, the hydraulic shock absorber 10 supports the axle via the axle bracket 39 fixed to the reinforcing tube 36, and is supported on the vehicle body via a stud 49 (described later) of the gas chamber cartridge 48. Therefore, the reinforcing tube 36 functions as a strength member for receiving a load between the vehicle side and the axle side, together with the piston rod 15.

A lower spring bracket 40 is welded to the outer peripheral portion on one side of the reinforcing tube 36. An upper spring bracket (not shown) is fixed to the stud 49. The suspension spring is stretched between the lower spring bracket 40 and the upper spring bracket. A spring load from the suspension spring is supported on the cylinder 12 via the stud 49, and further, is supported on the piston rod 15 via the end member 34. In FIG. 1 and FIG. 2, a reference numeral 41 denotes a seal member, and the seal member 41 is lubricated by oil filled between the cylinder 12 and the reinforcing tube 36.

Figure 3:
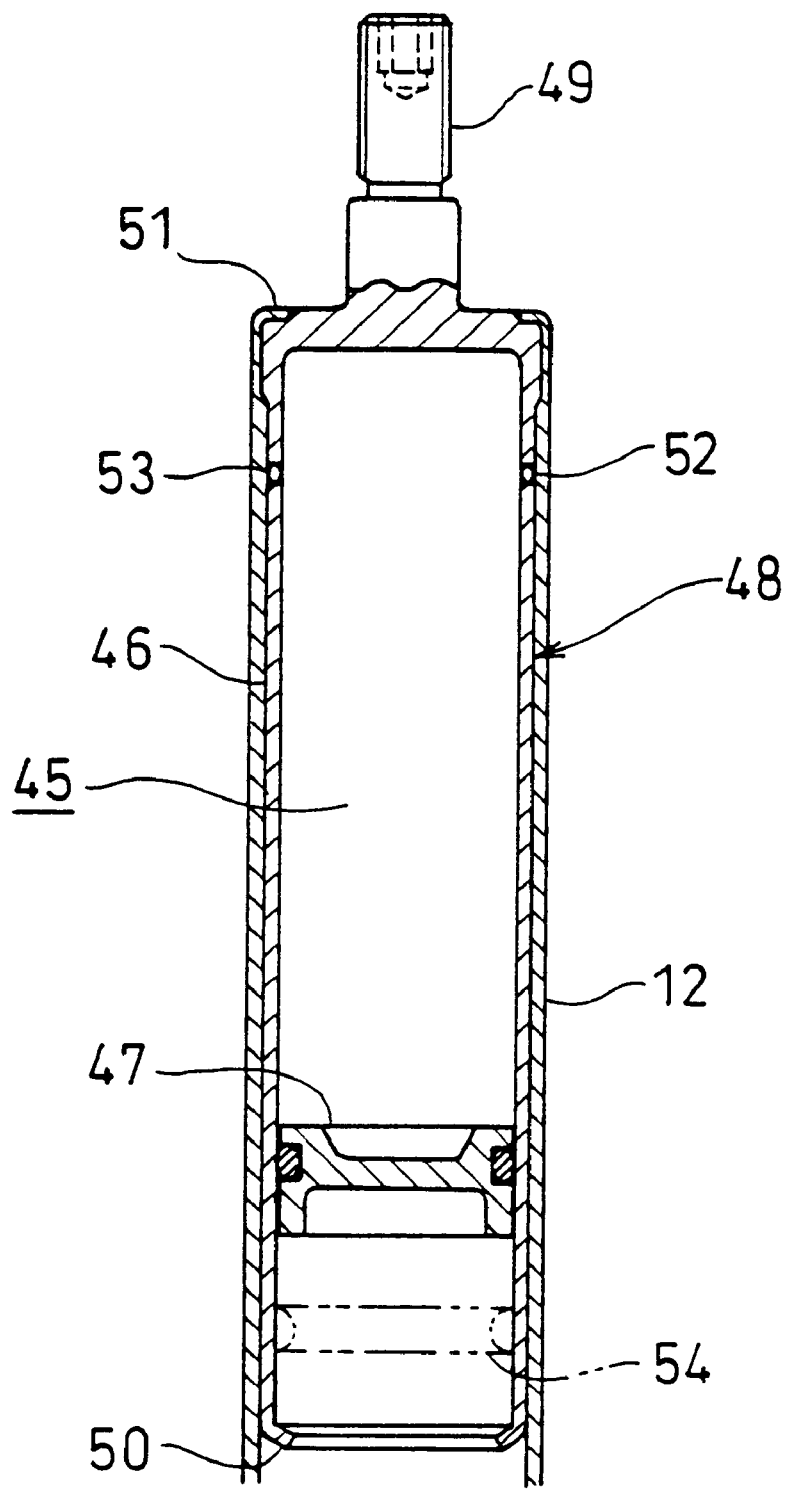
FIG. 3 is an enlarged cross-sectional view showing an upper portion of the hydraulic shock absorber shown in FIG. 1.

Now, as shown in FIG. 1 and FIG. 3, the hydraulic shock absorber 10 is formed with a gas chamber 45 in which a gas such as nitrogen gas is encapsulated, in order to compensate a capacity variation or rate caused when the piston rod 15 enters the cylinder 12 or retreats from the cylinder 12. Further, the gas chamber 45 is constructed in the following manner. More specifically, the nitrogen gas is encapsulated in a gas chamber case 46, and a free piston 47, which functions as a partition wall member, is slidably provided in the gas chamber case 46, and thus, a gas chamber cartridge 48, which is a cartridge type, is inserted and fixed to one end side of the cylinder 12. The gas chamber 45 and the rod side chamber 16A are partitioned by means of the free piston 47.

Figure 4:
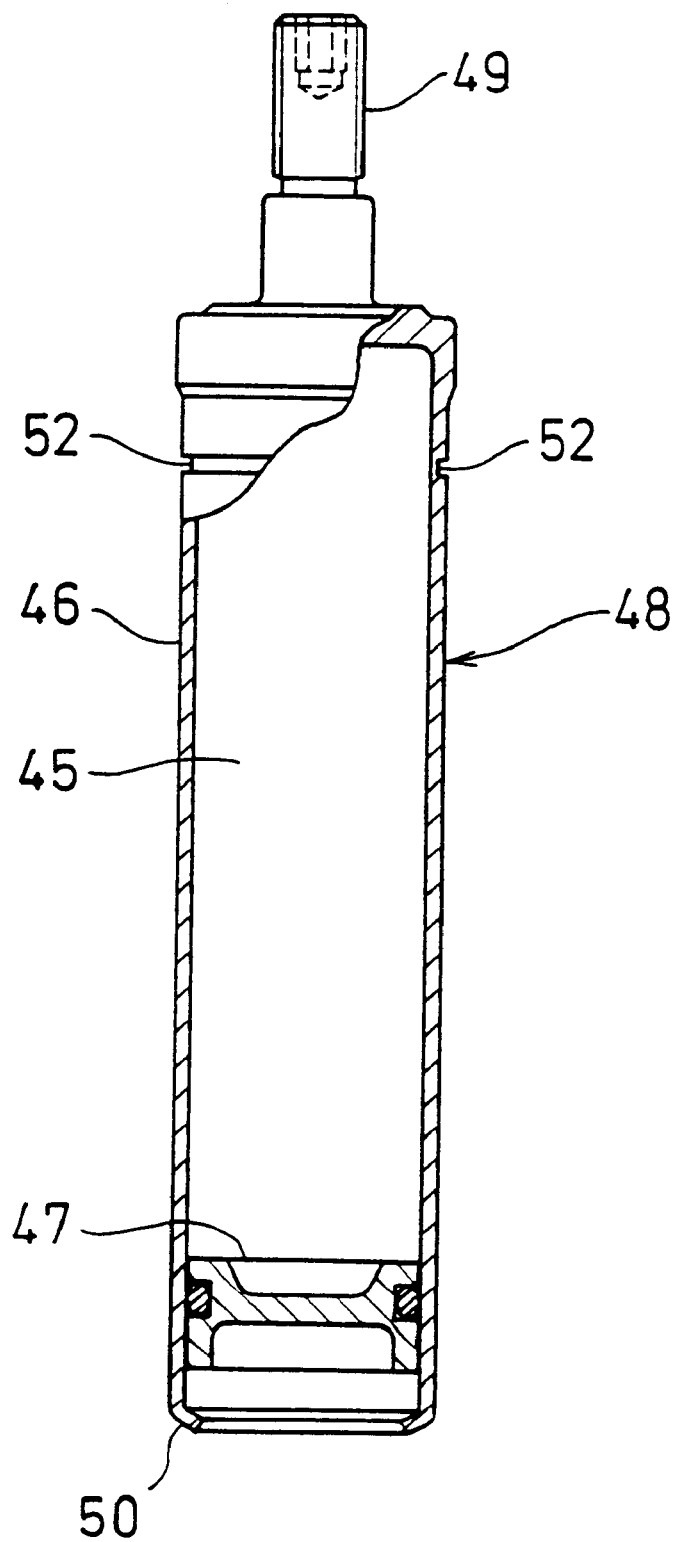
FIG. 4 is a cross-sectional view showing a gas chamber cartridge of the hydraulic shock absorber shown in FIG. 1.
Figure 5:
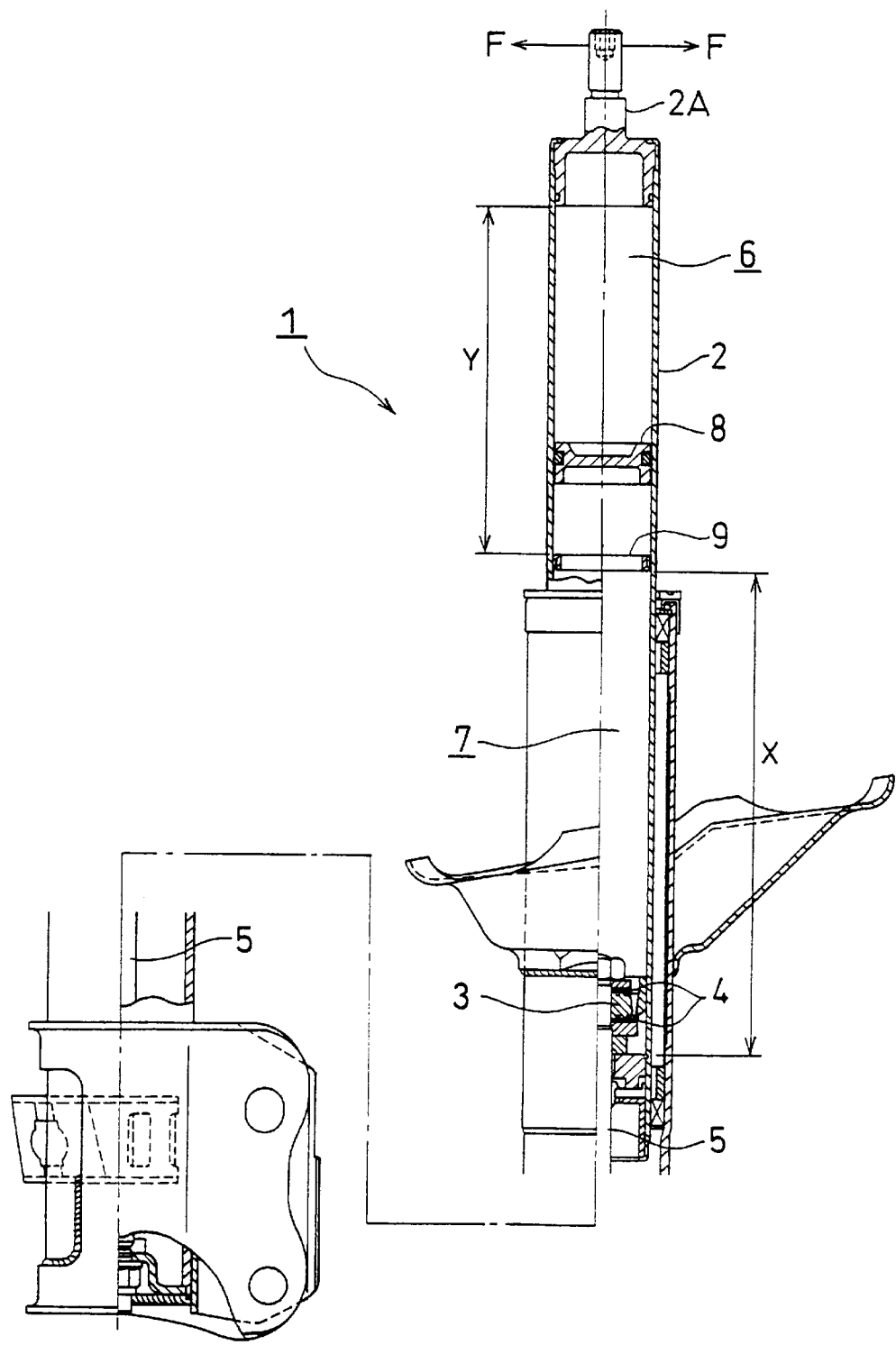
FIG. 5 is a cross-sectional view showing a conventional hydraulic shock absorber.

The gas chamber case 46 of the gas chamber cartridge 48 shown in FIG. 3 and FIG. 4 is formed by cold forging. More specifically, a metal mass placed on a die (not shown) and is extruded by means of punching (not shown) so as to form the gas chamber case. By doing so, a surface roughness on the inner peripheral surface of the case is produced at twice the surface roughness of the slidable range of the piston 14 in the cylinder 12. Further, by cold forging, the gas chamber case 46 is formed integrally with a stud 49 which is used as a fitting portion for attaching the hydraulic shock absorber to the vehicle body.

The gas chamber cartridge 48 is constructed in the following manner. Nitrogen gas is encapsulated in the gas chamber case 46 thus formed with a predetermined gas pressure, and in this state, the free piston 47 pushed into the gas chamber case 46. Subsequently, an opening end portion of the gas chamber case 46 is bent inwardly so as to form a stopper 50 for preventing the free piston 47 from coming off. There is thus provided a gas chamber cartridge 48 which has a sealed structure encapsulating nitrogen gas, and is of a removable cartridge type.

The gas chamber cartridge 48 thus constructed is inserted into one end side of the cylinder 12, that is, the end side where the piston rod 15 is not projected, and one end side of the cylinder 12 is bent inwardly, and thus, the gas chamber cartridge 48 is fixed to the cylinder 12 by a bending portion 51. When assembling the gas chamber cartridge 48 into the cylinder 12, an O ring 53 is fitted into a groove 52 formed in the overall outer circumference of the gas chamber case 46, and the gas chamber cartridge 48 and the cylinder 12 are mutually sealed by means of the O ring 53. Also, the free piston 47 is prevented from coming off by the stopper 50, and is situated outside the slidable range of the piston 14 in the cylinder 12.

Next, the procedures for assembling the hydraulic shock absorber 10 will be described.

First, the gas chamber cartridge 48 is inserted into one end side of the cylinder 12, and one end side of the cylinder 12 is bent inwardly, and thus, the gas chamber cartridge 48 is fixed to the cylinder 12 by the bending portion 51. At this time, the gas chamber cartridge 48 and one end side of the cylinder 12 are sealed by means of the O ring 53.

Next, the piston 14 connected to the piston rod 15 is inserted into the other end side of the cylinder 12, and the cylinder 12 is filled with a hydraulic fluid, and subsequently, the rod guide 18 and the seal 20 are inserted into the cylinder 12. The rod guide 18 and seal 20 are fixed to the cylinder 12 by means of the retaining member 21 supported on the stopper ring 19 and the bending portion 29, and then, the other end side of the cylinder 12 is sealed, and thus, a single-tube separation pressure type hydraulic shock absorber is constructed.

Thereafter, the reinforcing tube 36 is inserted into the outer circumference of the cylinder 12, and the end member 34 welded to the reinforcing member 36 is fixed to the piston rod 15 by nut 35. Oil is filled between the cylinder 12 and the reinforcing tube 36, that is, between guide bushes 37 and 38, and thereby, an inverted strut type hydraulic shock absorber 10 is assembled.

Therefore, the hydraulic shock absorber 10 of the aforesaid embodiment has the following effects ① to ④.

① The gas chamber 45 defined in the cylinder 12 is constructed by inserting the gas chamber cartridge 48 which is a cartridge type, into the cylinder 12, and is fixed to the cylinder 12 via the caulking portion 51. The inner circumferential surface of the gas chamber case 46 of the gas chamber cartridge 48, where the inner free piston 47 slides, is grease lubricated; on the other hand, the piston slidable range of the cylinder 12 where the piston 14 slides, is hydraulic fluid lubricated. Thus, the former and latter are lubricated differently from each other; for this reason, in order to improve responsibility and resistant abrasion performance of the free piston 47, the surface roughness of the gas chamber case must be enhanced more than (about twice as much as) the surface roughness of the piston slidable range of the cylinder 12. However, the gas chamber case 46 is formed by cold forging, so that the surface roughness of the inner circumferential surface can be constructed about twice as much as the slidable range of the piston 14 of the cylinder 12, without being subjected to additional machining. Further, in the inner surface of the cylinder 12, there is no need of enhancing the surface roughness of a portion corresponding to the slidable range of the free piston 47 more than the surface roughness of the slidable range of the piston 14. This serves to reduce the number of machining steps for the cylinder 12.

② In the case of defining the gas chamber 45 in the cylinder 12 by directly locating the free piston therein, the cylinder 12 is filled with the nitrogen gas, and thereafter, hydraulic fluid is injected therein; for this reason, an assembling apparatus for the hydraulic shock absorber is big and complicated. However, according to the present embodiment, the gas chamber 45 of the hydraulic shock absorber 10 is constructed with the use of the gas chamber cartridge 48 in which the nitrogen gas has previously been encapsulated by the free piston 47. Therefore, it is possible to simplify the assembling apparatus for the hydraulic shock absorber 10, and to reduce the number of assembling steps.

③ In the gas chamber case 46 of the gas chamber cartridge 48, the stopper 50 for restricting the free piston 47 is formed by subjecting the opening end portion of the gas chamber case 46 to bending. Thus, even if the hydraulic fluid filled in the cylinder 12 leaks and the oil escapes, the free piston 47 is restricted by means of the stopper 50 so as not to collide with the piston 14. Further, the stopper 50 is formed by subjecting the opening end portion of the gas chamber case 46 to bending; therefore, machining can be more simple, and the machining cost can be reduced as compared with the case of constructing the stopper with the use of another member.

④ The gas chamber case 46 of the gas chamber cartridge 48 is formed integrally with the stud 49 for attaching the hydraulic shock absorber 10 to the vehicle body. Thus, the strength and reliability of gas leakage prevention can be improved as compared with the case where the gas chamber case and the stud are formed of independent member and are connected to each other. In particular, in the case of the invert strut type hydraulic shock absorber 10 having the stud 49 attached to the vehicle body, even if a torsion load F of the direction perpendicular to the axis of the hydraulic shock absorber 10 is applied to the stud 49, a portion where the gas chamber case 46 is inserted into the cylinder 12 is long, so that the strength against the torsion load F can be enhanced depending upon the inserted length of the gas chamber case 46 without enhancing the bending strength of the cylinder 12 for fixing the gas chamber case 46 of the gas chamber cartridge 48.

Also, in the aforesaid embodiment, the stopper 50 has been constructed by bending the opening end portion of the gas chamber case 46 of the gas chamber cartridge 48 so that the opening end portion thereof is bent inwardly. As shown by a chain double-dashed line in FIG. 3, a diameter of the inner peripheral surface of the opening end portion of the gas chamber cartridge 48 is reduced so as to form a reduced diameter portion 54. Then, the reduced diameter portion 54 may be used as a stopper for the free piston 47.

Further, in place of the bending portion 51 for fixing the gas chamber cartridge 48 to one end portion of the cylinder 12, the gas chamber cartridge 48 may be fixed to the cylinder 12 in a manner of forming a male screw on the outer periphery on one end side of the cylinder 12, and screwing a cap onto the male screw.

Furthermore, the gas chamber cartridge 48 has been provided with the stud 49 for attaching the hydraulic shock absorber 10 to the vehicle body. An axle fitting portion having a bearing portion for supporting an axle is formed integrally with the gas chamber case 46 of the gas chamber cartridge 48, and thus, the hydraulic shock absorber 10 may be constructed as an erect strut type hydraulic shock absorber.

In addition, the aforesaid hydraulic shock absorber 10 is a single tube type. The hydraulic shock absorber 10 may be a double tube type hydraulic shock absorber which is constructed in a manner that the gas chamber cartridge 48 is inserted into an inner tube, and an outer tube is provided outside the inner tube.

As is evident from the above description, according to the present invention, there can be provided a hydraulic shock absorber which can reduce the number of machining steps and the number of assembling steps.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A hydraulic shock absorber, comprising:
   a cylinder which is filled with a hydraulic fluid;
   a piston connected to one end of a piston rod, and which is slidably disposed in the cylinder; and
   a partition wall member which is slidably disposed in the cylinder so as to partition the cylinder into a gas chamber and an oil chamber, wherein
   a gas chamber cartridge inserted into one side of the cylinder so as to be fixed thereto, said partition wall member being slidably disposed in a gas chamber case of the gas chamber cartridge, and defining one chamber partitioned by the partition wall member of the gas chamber case as the gas chamber encloses a gas therein, and defining the other chamber partitioned by the partition wall member of the gas chamber case as connected to the oil chamber on the other side of the cylinder, said gas chamber case is formed integrally with a fitting portion for attaching the hydraulic shock absorber to a vehicle body or an axle.

2. The hydraulic shock absorber according to claim 1, wherein the hydraulic shock absorber of an invert strut type and the fitting portion is formed integrally with the gas chamber case attached to a vehicle body side, and the piston rod is attached to an axle side.

3. The hydraulic shock absorber according to claim 1, wherein the gas chamber case is formed with a stopper for restricting the partition wall member by subjecting the opening end portion to bending.

4. A hydraulic shock absorber, comprising:

a cylinder which is filled with a hydraulic fluid;

a piston connected to one end of a piston rod, and which is slidably disposed in the cylinder; and a partition wall member which is slidably disposed in the cylinder so as to partition the cylinder into a gas chamber and an oil chamber, wherein a gas chamber cartridge inserted into one side of the cylinder so as to be fixed thereto, said partition wall member being slidably disposed in a gas chamber case of the gas chamber cartridge, and defining one chamber partitioned by the partition wall member of the gas chamber case as the gas chamber encloses a gas therein, and defining the other chamber partitioned by the partition wall member of the gas chamber case as connected to the oil chamber on the other side of the cylinder, and said gas chamber cartridge comprising a tube-shaped gas chamber case which one end is closed and the other end is open, said partition wall member slidably disposed in the gas chamber case, and a stopper means disposed near the opening end of the gas chamber case which prevents the partition wall member from coming off, and said gas chamber cartridge forming a gas chamber which is partitioned by the partition wall member on the closing end side of the gas chamber case and said gas chamber has already enclosed a gas therein, and said gas chamber cartridge has been previously sub-assembled, and said sub-assembled gas chamber cartridge inserted and fixed on one end of said cylinder, said gas chamber case is formed integrally with a fitting portion for attaching the hydraulic shock absorber to a vehicle body or an axle.

5. The hydraulic shock absorber according to claim 4, wherein the gas chamber case is formed integrally with a fitting portion for attaching the hydraulic shock absorber to a vehicle body or an axle.

6. The hydraulic shock absorber according to claim 4, wherein the hydraulic shock absorber of an invert strut type and the fitting portion is formed integrally with the gas chamber case attached to a vehicle body side, and the piston rod is attached to an axle side.

7. The hydraulic shock absorber according to claim 4, wherein the stopper for restricting the partition wall member is formed by subjecting the opening end portion to bending.

* * * * *